(12) United States Patent
Labaste Mauhe et al.

(10) Patent No.: US 10,099,531 B2
(45) Date of Patent: Oct. 16, 2018

(54) DEVICE FOR AIR CONDITIONING A DRIVE TRAIN AND A PASSENGER COMPARTMENT OF A VEHICLE

(71) Applicant: Valeo Systemes Thermiques, Le Mesnil Saint Denis (FR)

(72) Inventors: Laurent Labaste Mauhe, Clamart (FR); Regine Haller, Boissy Sans Avoir (FR); Abdelmajid Taklanti, Gif sur Yvette (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 1032 days.

(21) Appl. No.: 14/365,378

(22) PCT Filed: Nov. 30, 2012

(86) PCT No.: PCT/EP2012/074054
§ 371 (c)(1),
(2) Date: Jun. 13, 2014

(87) PCT Pub. No.: WO2013/087425
PCT Pub. Date: Jun. 20, 2013

(65) Prior Publication Data
US 2014/0374060 A1    Dec. 25, 2014

(30) Foreign Application Priority Data
Dec. 15, 2011   (FR) ...................... 11 03865

(51) Int. Cl.
*B60H 1/00* (2006.01)
*B60H 1/03* (2006.01)
(Continued)

(52) U.S. Cl.
CPC ..... *B60H 1/00007* (2013.01); *B60H 1/00278* (2013.01); *B60H 1/00385* (2013.01);
(Continued)

(58) Field of Classification Search
CPC ............ B60H 1/00007; B60H 1/00278; B60H 1/00385; B60H 1/00914; F25B 1/005
(Continued)

(56) References Cited

U.S. PATENT DOCUMENTS 6,360,835 B1 *   3/2002   Skala .................. B60L 11/1892
                                                         123/41.29
7,789,176 B2 *   9/2010   Zhou ................... B60H 1/00278
                                                         180/65.1
(Continued)

FOREIGN PATENT DOCUMENTS

WO    WO2011086683 A1    7/2011

OTHER PUBLICATIONS

English language abstract for WO2011086683 extracted from espacenet.com database on Jul. 29, 2014, 2 pages.
(Continued)

*Primary Examiner* — Raheena R Malik
(74) *Attorney, Agent, or Firm* — Howard & Howard Attorneys PLLC

(57) ABSTRACT

The invention relates to an air conditioning device comprising a refrigerant circuit and a coolant circuit. The refrigerant circuit comprises at least a compressor, an internal heat exchanger, an external heat exchanger and an evaporator The coolant circuit comprises at least a first heat exchanger associated with a first component, a second heat exchanger associated with a second component and a radiator. A fluid/fluid heat exchanger is installed in the refrigerant circuit and in the coolant circuit, with the coolant circuit comprising a first loop and a second loop which are interconnected by an interconnection device. The first loop comprises the fluid/fluid heat exchanger, the first heat exchanger associated with the first component and a means for heating the coolant with the means interposed between (Continued)

the interconnection device and the fluid/fluid heat exchanger, the second loop comprising the second heat exchanger associated with the second component and the radiator.

15 Claims, 7 Drawing Sheets

(51) Int. Cl.
    *B60H 1/32*     (2006.01)
    *B60H 1/22*     (2006.01)
    *F25B 1/00*     (2006.01)
    *B60L 1/00*     (2006.01)
    *B60L 1/02*     (2006.01)
    *B60L 3/00*     (2006.01)
    *B60L 11/18*     (2006.01)

(52) U.S. Cl.
    CPC ..... *B60H 1/00914* (2013.01); *B60H 1/00921* (2013.01); *B60H 1/034* (2013.01); *B60H 1/2215* (2013.01); *B60H 1/321* (2013.01); *B60H 1/3213* (2013.01); *B60L 1/003* (2013.01); *B60L 1/02* (2013.01); *B60L 3/003* (2013.01); *B60L 3/0046* (2013.01); *B60L 3/0061* (2013.01); *B60L 11/1803* (2013.01); *B60L 11/1874* (2013.01); *B60L 11/1875* (2013.01); *F25B 1/005* (2013.01); *B60H 2001/00307* (2013.01); *B60H 2001/3288* (2013.01); *B60L 2210/40* (2013.01); *B60L 2240/34* (2013.01); *B60L 2240/36* (2013.01); *B60L 2240/425* (2013.01); *B60L 2240/525* (2013.01); *B60L 2240/545* (2013.01); *B60L 2240/662* (2013.01); *B60L 2260/56* (2013.01); *Y02T 10/642* (2013.01); *Y02T 10/7005* (2013.01); *Y02T 10/705* (2013.01); *Y02T 10/7241* (2013.01); *Y02T 10/7291* (2013.01); *Y02T 90/16* (2013.01)

(58) Field of Classification Search
    USPC .......................................................... 165/62
    See application file for complete search history.

(56) References Cited

U.S. PATENT DOCUMENTS

| | | | | |
|---|---|---|---|---|
| 8,336,319 | B2* | 12/2012 | Johnston | B60L 3/0046 62/434 |
| 8,616,017 | B2* | 12/2013 | Shimazu | F24F 3/065 62/335 |
| 2002/0043413 | A1* | 4/2002 | Kimishima | B60H 1/323 180/68.1 |
| 2008/0251235 | A1 | 10/2008 | Zhou | |
| 2011/0174000 | A1 | 7/2011 | Richter et al. | |
| 2012/0205088 | A1 | 8/2012 | Morista et al. | |
| 2012/0297805 | A1* | 11/2012 | Kamada | B60H 1/00278 62/208 |
| 2012/0304674 | A1* | 12/2012 | Schwarzkopf | B60H 1/00385 62/79 |
| 2013/0319029 | A1* | 12/2013 | Sekiya | B60H 1/00899 62/238.7 |
| 2014/0041826 | A1* | 2/2014 | Takeuchi | B60L 1/02 165/10 |

OTHER PUBLICATIONS

International Search Report for PCT/EP2012/074054 dated Jan. 16, 2013, 5 pages.

\* cited by examiner

DEVICE FOR AIR CONDITIONING A DRIVE TRAIN AND A PASSENGER COMPARTMENT OF A VEHICLE

RELATED APPLICATIONS

This application claims priority to and all the advantages of International Patent Application No. PCT/EP2012/074054, filed on Dec. 30, 2012, which claims priority to French Patent Application No. FR 11/03865, filed on Dec. 15, 2011, the content of which is incorporated herein by reference.

The technical field of the present invention is that of motor vehicles, in particular electrically powered vehicles. More particularly, the invention relates to an air conditioning device which ensures the heating and the cooling of the electrical drive train and of the passenger compartment of such a vehicle.

Currently, automobile manufacturers are developing vehicles which function on the basis of new sources of energy in addition to or instead of vehicles with an internal combustion engine. In particular, vehicles are proposed for which the propulsion is provided on the basis of electrical power. Such a solution represents an interesting alternative. However, it is necessary to install different components associated with the electrical drive train such as batteries for storing electrical energy, an electric motor for ensuring propulsion of the vehicle and an inverter for delivering an electrical signal to the electric motor.

The service life and the performance levels of these components, in particular the batteries, are conditioned by the temperature of the medium surrounding them. It is therefore necessary to guarantee that these components are kept at a predetermined temperature during the travelling phase of the vehicle, that is to say when the batteries are discharging. It is also necessary to guarantee cooling of these components during the charging phases, since these phases result in heating of these components.

At the same time, it is necessary to ensure the comfort of the passengers in a passenger compartment of the vehicle. To this end, it is necessary to modify the aerothermal parameters of the passenger compartment of the vehicle. It is, nevertheless, necessary that the air conditioning of the passenger compartment does not excessively impair the autonomy of the vehicle.

To this end, it has been proposed to use a so-called "conventional" air conditioning loop, activated by an electrical compressor, and for which the circulation of the refrigerant fluid is configured in order to enable heating or cooling of an air flow intended to be sent into the passenger compartment of the vehicle. Nevertheless, such a "conventional" air conditioning loop does not enable the air conditioning of the components of the drive train.

It has also been proposed to use a so-called "conventional" air conditioning loop, which exchanges with a plurality of secondary loops in which a coolant circulates. The secondary loops ensure the cooling of the components of the drive train. However, this solution is very complex, in particular with regard to the control of elements which ensure the interconnection between the secondary loops, in particular when toggling between the various modes of operation.

Moreover, the configuration above uses a front face exchanger, which functions in condenser mode and in evaporator mode. However, the output of the evaporator mode is affected in the case where the temperature of the air flow which passes through this front face exchanger falls below 0° C. and this air flow contains a substantial level of humidity. This situation results in icing of the front face exchanger that affects the heat exchange.

The object of the present invention therefore is to overcome the previously described disadvantages, principally by proposing an air conditioning loop comprising a refrigerant circuit and a coolant circuit which is simple to implement, whilst guaranteeing the air conditioning of the components of the drive train and of the passenger compartment in all conditions, that is to say, in particular during hot weather in summer, in cold weather in winter, in humid weather or during the battery charging phase.

The invention therefore relates to an air conditioning device comprising a refrigerant circuit and a coolant circuit, with the refrigerant circuit comprising at least a compressor, an interior heat exchanger, an exterior heat exchanger and an evaporator,
the coolant circuit comprising at least a first heat exchanger associated with a component, a second heat exchanger associated with a component and a radiator,
a fluid/fluid heat exchanger installed in the refrigerant circuit and in the coolant circuit,
the coolant circuit comprising a first loop and a second loop interconnected by an interconnection device is innovative in that the first loop comprises the fluid/fluid heat exchanger, the first heat exchanger associated with a component and a means for heating the coolant interposed between the interconnection device and the fluid/fluid heat exchanger, with the second loop comprising the second heat exchanger associated with a component and the radiator.

The fluid/fluid heat exchanger produces a heat exchange between the refrigerant fluid and the coolant.

According to a further feature, the coolant circuit comprises a third heat exchanger associated with a component installed in the second loop. It will be noted that the first heat exchanger associated with a component, the second heat exchanger associated with a component and/or the third heat exchanger associated with a component are separate heat exchangers.

According to a further feature, the heating means comprises an electrical heating element.

Advantageously, the heating means is installed immediately upstream of the fluid/fluid heat exchanger, according to the direction of circulation of the coolant in the first loop.

Also advantageously, the heating means is installed immediately downstream of the interconnection device, according to the direction of circulation of the coolant in the first loop.

In addition, the first loop comprises a first pump for circulation of the coolant.

According to a further feature, the second loop comprises a second pump for circulation of the coolant.

Also advantageously, the second loop comprises a bypass conduit of the radiator, known as the third bypass conduit.

According to a variant of the present invention, the fluid/fluid heat exchanger is installed parallel to the evaporator.

In a complementary or alternative manner, the refrigerant circuit includes a bypass conduit of the interior heat exchanger, known as the first bypass conduit, and also another bypass conduit of the exterior heat exchanger, known as the second bypass conduit.

According to a variant, an interior air flow is channeled through a housing in which the evaporator and the interior heat exchanger are disposed in order to be passed through by the interior air flow prior to distribution in a passenger compartment of a vehicle.

The invention further relates to the different modes of operation or configurations of the refrigerant circuit and of the coolant circuit.

Thus, the refrigerant fluid circulates in the refrigerant circuit, successively, in the compressor, the first bypass conduit, the exterior heat exchanger or the second bypass conduit, the evaporator and/or the fluid/fluid heat exchanger, in order to return to the compressor.

Alternatively, the refrigerant fluid circulates in the refrigerant circuit, successively, in the compressor, the interior heat exchanger, the exterior heat exchanger or the second bypass conduit, the evaporator and/or the fluid/fluid heat exchanger, in order to return to the compressor.

According to a variant, the coolant circulates in the first loop, successively, in the first heat exchanger associated with a component, the interconnection device, the heating means, the fluid/fluid heat exchanger, in order to return to the first heat exchanger associated with a component.

In such a device, the coolant circulates in the second loop, successively, in the second heat exchanger associated with a component, possibly in the third heat exchanger associated with a component, in the radiator and/or the third bypass conduit, in the interconnection device, in order to return to the second heat exchanger associated with a component.

Finally, the coolant circulates in the coolant circuit, successively, in the first heat exchanger associated with a component, the interconnection device, the second heat exchanger associated with a component, the radiator and/or the third bypass conduit, the interconnection device, the heating means, the fluid/fluid heat exchanger, in order to return to the first heat exchanger associated with a component.

Preferably, the fluid/fluid heat exchanger is interposed between, on the one hand, the exterior heat exchanger and/or the bypass channel and, on the other hand, the compressor.

According to the present invention, the interior air flow is a flow of recycled air, coming from the passenger compartment of the vehicle, and/or a flow of fresh air, that is to say from the exterior of the passenger compartment of the vehicle.

According to the present invention, the refrigerant circuit and the refrigerant circuit can be configured according to the different modes of operation in combination.

The various configurations of the refrigerant circuit and of the coolant circuit make it possible in particular to ensure:
- a "summer" mode, which makes it possible to cool the interior air flow sent into the passenger compartment;
- a "winter" mode, which makes it possible to heat the interior air flow;
- a "dehumidification" mode, which makes it possible to dehumidify the interior air flow, whilst ensuring air conditioning of at least one of the components associated with the electrical drive train such as batteries for storing electrical energy, an electric motor for driving the vehicle and an inverter for matching the electrical signal to the electric motor.

The present invention is particularly capable of operating in a battery charging mode in which the refrigerant fluid cools the coolant by means of the fluid/fluid heat exchanger.

A first advantage of the present invention resides in the possibility of benefiting from the thermal inertia of the battery. The invention makes it possible in particular to share the thermal losses of components of the electrical drive train and to dissipate them in the refrigerant fluid, by means of the fluid/fluid heat exchanger, in order to improve the output of the thermodynamic cycle which takes place in the refrigerant circuit.

The invention makes it possible, in a general manner, to maintain optimal conditions in the use of sensitive elements of the electrical drive train regardless of the phase of use of the vehicle: stopping, charging, urban travel or extra-urban travel.

A further advantage resides in the possibility of limiting the ageing of the components of the drive train, in particular the battery, by maintaining an optimum temperature during the operational phases, including a fast charging phase of approximately one hour, for example.

A further advantage resides in the guarantee of a level of thermal comfort in the passenger compartment over a wide range of exterior temperatures, in particular between −20° C. and +45° C.

A further advantage resides in the fact that the exterior heat exchanger is either used exclusively as condenser or is not used. This avoids the problem of the formation of ice on the surface of this exchanger, which is known when this exchanger is used as evaporator.

Further features and advantages of the invention will become apparent from the following description, with reference to the appended drawings, which are provided by way of non-limiting examples, which can be used to complete the understanding of the present invention and the disclosure of its implementation, but also, as appropriate, can contribute to its definition, wherein.

Figure 1:
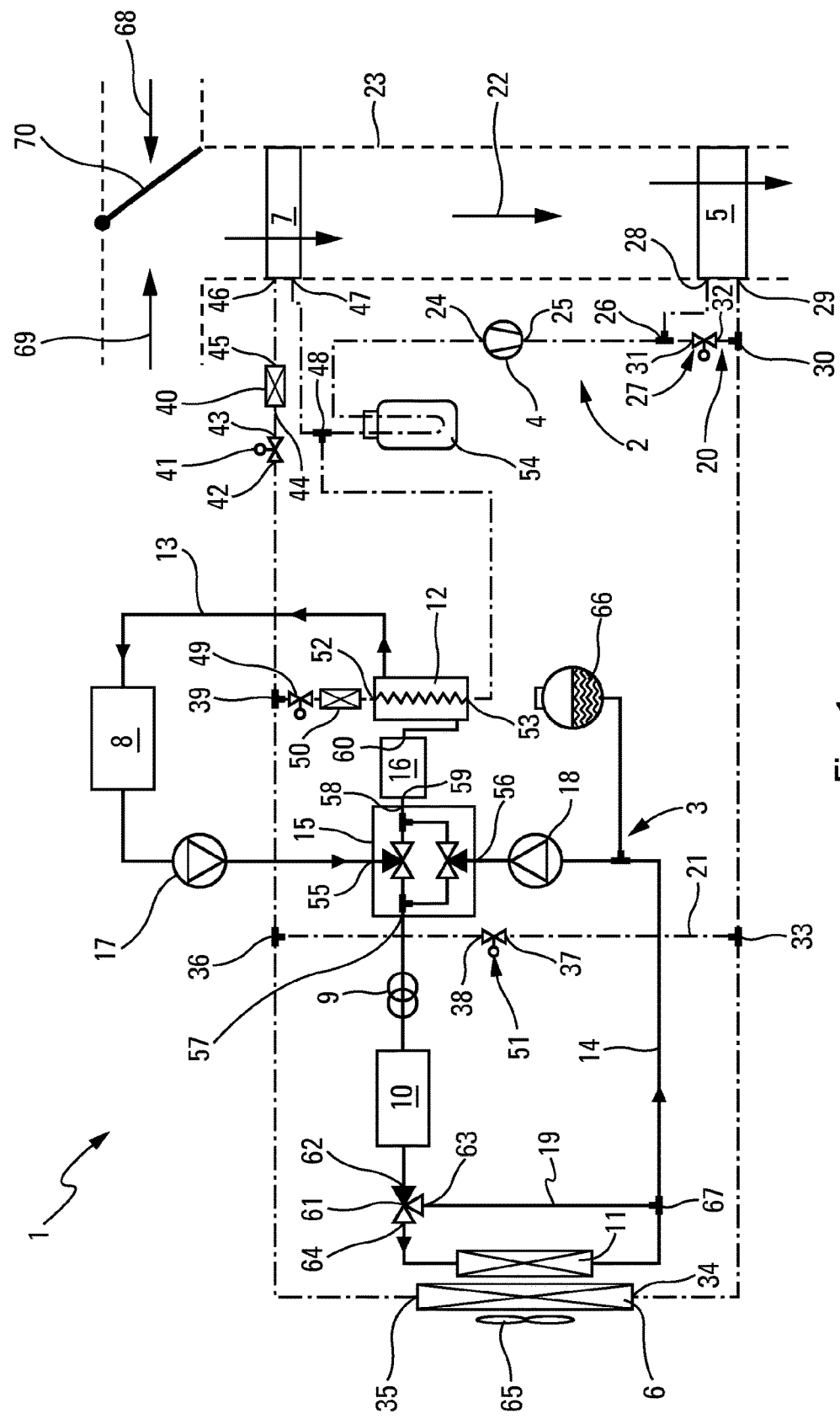
FIG. 1 shows a schematic view of an air conditioning device according to the present invention.

In FIGS. 2 to 7 detailing the present invention and described below, the convention has been adopted that a fluid circulation is represented by a solid line whilst an absence of fluid circulation is represented by a broken line.

As shown, an air conditioning device 1 according to the present invention comprises a refrigerant circuit 2 and a coolant circuit 3.

The refrigerant circuit 2 is a closed loop, inside which a refrigerant fluid circulates. The refrigerant fluid can be a sub-critical refrigerant fluid, such as a composition known by the designation R1234yf or R134A, for example. The refrigerant fluid also can be a super-critical refrigerant fluid, such as carbon dioxide known by the designation R744A, for example.

The refrigerant fluid is circulated by a compressor 4, the function of which is to increase the pressure and the temperature of the refrigerant fluid. The compressor 4 is advantageously electrical, in particular adapted to operate at a voltage of between 200 Volts and 500 Volts. "Electrical" is understood to mean that the driving of the compression mechanism is operated by an electric motor, for example installed inside the compressor.

Moreover, the compressor 4 is, for example, a piston compressor, a vane compressor or a scroll compressor. Similarly, the compressor 4 can have an internal control or an external control.

The compressor 4 comprises an inlet orifice 24, through which the refrigerant fluid arrives, and an outlet orifice 25, through which the compressed refrigerant fluid is evacuated. The outlet orifice 25 is connected to a first connection point 26 having a fluid inlet and two fluid outlets. The fluid inlet is connected to the outlet orifice 25 of the compressor 4, whereas a first of the two fluid outlets is connected to an inlet 28 of an interior heat exchanger 5. The second of the two fluid outlets is itself connected to a first switching means 27, for example, a first two-way valve, by means of an inlet channel 31.

The interior heat exchanger 5 is capable of allowing an exchange of calories with an interior air flow 22 intended to be sent to the interior of a passenger compartment of a vehicle. In practice, the interior heat exchanger 5 is installed in a housing 23, in which the interior air flow 22 circulates that is sent into the passenger compartment of the motor vehicle.

Such an interior heat exchanger 5 further comprises an outlet 29 connected to a second connection point 30, said connection point including two inlets and one outlet. The first of these inlets is connected to an outlet channel 32 of the first two-way valve. A second of these inlets is connected to the outlet 29 of the interior heat exchanger 5.

The housing 23 also accommodates an evaporator 7, advantageously disposed upstream of the interior heat exchanger 5, according to the direction of circulation of the interior air flow 22. Optionally, an additional radiator (not shown), for example an electric radiator, is installed in the housing 23, advantageously downstream of the interior heat exchanger 5. According to the present invention, the evaporator 7 is integrated in the refrigerant circuit 2.

Preferably, the interior air flow 22 passes through the evaporator 7 and/or the interior heat exchanger 5 and/or the additional radiator. Consequently, it appears that the interior heat exchanger 5 is an air/refrigerant fluid heat exchanger.

A bypass conduit 20 of the interior heat exchanger 5 is provided between the second outlet of the first connection point 26 and the inlet of the second connection point 30. This bypass conduit 20 will be referred to hereafter as the first bypass conduit 20.

The first two-way valve is installed on this first bypass conduit 20 in such a way as to control a circulation of refrigerant fluid through the first bypass conduit 20.

Alternatively, the first switching means 27 can be a three-way valve installed in place of either the first connection point 26 or the second connection point 30.

The first bypass conduit 20 enables the refrigerant fluid to circulate directly from the compressor 4 towards the second connection point 30 without passing through the interior heat exchanger 5, in order to avoid any exchange of heat with the interior air flow 22.

The circulation of the refrigerant fluid in the first bypass conduit 20 or in the interior heat exchanger 5 is governed by the first two-way valve. To this end, the first two-way valve is controlled, for example, by a control strategy implemented by a control device (not shown).

For better integration, a module containing the bypass conduit 20, the exchanger 5 and the switching means 27 can be created.

The second connection point 30 is connected to a third connection point 33 capable of allowing the refrigerant fluid to circulate either towards a second bypass conduit 21 or towards an exterior heat exchanger 6.

The exterior heat exchanger 6 is capable of enabling an exchange of calories with an exterior air flow intended to be sent to the exterior of the passenger compartment of a vehicle. Therefore, this is an air/refrigerant fluid heat exchanger.

According to the various modes of operation of the present invention, the exterior heat exchanger 6, when the refrigerant fluid flows through it, is capable of operating solely as a condenser according to the configurations of the refrigerant circuit 1.

Preferably, the exterior heat exchanger 6 is installed in the front face of the vehicle in order to benefit from a dynamic air flow, as an exterior air flow, when the vehicle is in motion.

The refrigerant fluid enters the exterior heat exchanger 6 via an inlet orifice 34 and leaves it via an outlet orifice 35, before joining a fourth connection point 36. This connection point is capable of receiving the refrigerant fluid originating from the exterior heat exchanger 6 and/or originating from the third connection point 33.

A bypass conduit 20 of the exterior heat exchanger, hereafter referred to as the second bypass conduit 21, is provided between this third connection point 33 and this fourth connection point 36.

Thus, the refrigerant fluid is capable of bypassing the exterior heat exchanger 6 by circulating through the second bypass conduit 21. This second bypass conduit 21 forms a channel preventing or reducing the circulation of refrigerant fluid in the exterior heat exchanger 6 in order to prevent or to reduce the heat exchange within the exterior heat exchanger 6 between the refrigerant fluid and the exterior air flow.

The circulation of the refrigerant fluid in the second bypass conduit 21 or in the exterior heat exchanger 6 is controlled by a second switching means 51, which in this case takes the form of a second two-way valve, preferably controlled by the control strategy implemented by the control device.

The second two-way valve comprises an inlet channel 37 connected to an outlet of the third connection point 33 and an outlet channel 38 connected to an inlet of the fourth connection point 36.

Alternatively, the second switching means 51 can be a three-way valve installed in place of either the third connection point 33 or the fourth connection point 36.

For better integration, a module containing the exterior heat exchanger 6, the third and fourth connection points 33, 36 and the second switching means 51 can be created.

An outlet of the fourth connection point 36 is connected to an inlet of a fifth connection point 39, which enables a circulation of refrigerant fluid, parallel to the evaporator 7, in a fluid/fluid heat exchanger 12. This fluid/fluid heat exchanger 12 ensures, in particular exclusively, a heat exchange between the refrigerant fluid circulating in the refrigerant circuit 2 and a coolant circulating in the coolant circuit 3.

A first expansion element 40 is disposed immediately upstream of the evaporator 7, according to the direction of circulation of the refrigerant fluid. Preferably, the first expansion element 39 is also disposed downstream of the fifth connection point 39, according to the direction of circulation of the refrigerant fluid.

A third switching means 41, hereafter referred to as the third two-way valve, is provided between this fifth connection point 39 and the expansion element 40. More specifically, the third two-way valve comprises an inlet 42 connected to an outlet of the fifth connection point and an outlet 43 connected to an inlet orifice 44 of the first expansion element 40. The refrigerant fluid comes out of this first expansion element 40 via an outlet orifice 45 connected to an inlet orifice of the evaporator 7.

The first expansion element 40 is, for example, a thermostatic expansion element, a calibrated orifice or even an electronic expansion valve controlled by the control strategy implemented by the control device.

After having passed through this first expansion element 40, the refrigerant flow enters the evaporator 7 through its inlet orifice 46. The lowering of the pressure of the refrigerant fluid operated by the first expansion element 40 ensures an exchange of heat enabling a lowering of the temperature and a dehumidification of the interior air flow 22 as it passes through the evaporator 7.

An outlet orifice 47 of the evaporator 7 is connected to a sixth connection point 48. According to the present invention, the fluid/fluid heat exchanger 12 is also connected to this sixth connection point 48. This sixth connection point 48 makes it possible to bring together the refrigerant fluid which has passed through the different parts of the refrigerant circuit 2, in particular parts of this circuit installed parallel to each other. A first part of this circuit comprises a fourth switching device 49, a second expansion element 50 and the fluid/fluid heat exchanger 12. A second part of this circuit comprises the third switching means 41, the first expansion element 40 and the evaporator 7.

Thus, the sixth connection point 48 receives the refrigerant fluid, either exclusively originating from the evaporator 7 or exclusively originating from the fluid/fluid heat exchanger 12, or originating simultaneously from these two components of the refrigerant circuit 2.

The second expansion element 50 is arranged between the fifth connection point 39 and the fluid/fluid heat exchanger 12. This second expansion element 50 is, for example, a thermostatic expansion element, a calibrated orifice or an electronic expansion valve controlled by the control strategy implemented by the control device.

The fourth switching means 49 is provided between this fifth connection point 39 and this second expansion element 50. In this embodiment this is a two-way valve 49.

For better integration, a module containing the first and second expansion elements 40, 41, and the third and fourth switching means 41, 49 can be created.

After having been expanded by the second expansion element 50, the refrigerant fluid enters the fluid/fluid heat exchanger 12 via an inlet orifice 52. In passing through the fluid/fluid heat exchanger 12, the refrigerant fluid exchanges heat with the coolant that is also circulating in the fluid/fluid heat exchanger 12. The refrigerant fluid leaves the fluid/fluid heat exchanger 12 via an outlet orifice 53 before joining the sixth connection point 48.

The refrigerant fluid brought together by this sixth connection point leaves that point in order to be directed towards the compressor 4.

Advantageously, an accumulator 54 is arranged upstream of the compressor 4 and downstream of the sixth connection point 48. The refrigerant fluid enters the accumulator 54 via an inlet directly connected to the sixth connection point 48. Finally, the accumulator 54 comprises an outlet, through which the refrigerant fluid leaves in order to return towards the compressor 4, entering said compressor via its inlet orifice 24.

According to the present invention, the air conditioning device 1 comprises the refrigerant circuit 2 and the coolant circuit 3. The coolant circuit 3 forms a closed loop, inside of which the coolant circulates, which fluid is, for example, a water-based composition with added glycol.

The coolant circuit 3 is formed by a first loop 13 and a second loop 14 mutually connected to one another by an interconnection device 15. This interconnection device 15 is produced, for example, in the form of a four-way valve, but it can also take the form of two three-way valves installed parallel to one another, as shown in FIG. 1.

Thus, as a function of the operating phase of the air conditioning device, the first loop 13 and/or the second loop 14 can operate independently or jointly.

The first loop 13 forms a circuit, in which are located a first pump 17, the interconnection device 15, a means 16 for heating the coolant, the fluid/fluid heat exchanger 12 and a first heat exchanger associated with a component 8, through which the coolant passes in this order.

The heating means 16 is interposed in this case between the interconnection device 15 and the fluid/fluid heat exchanger 12. It is advantageously directly upstream of the fluid/fluid heat exchanger 12. This heating means 16 can still be directly downstream of the interconnection device 15, with upstream and downstream being determined by the direction of circulation of the coolant in the first loop 13.

The first pump 17 is, for example, an electric pump, that is to say comprising an electric motor. It is connected to the interconnection device 15, with the fluid entering said device via a first inlet orifice 55.

The interconnection device 15 comprises, in addition to the first inlet orifice 55 forming part of the first loop 13, a second inlet orifice 56 forming part of the second loop 14. The interconnection device 15 further comprises a first outlet orifice 57 and a second outlet orifice 58 forming part of the second loop 14 and of the first loop 13, respectively, of the coolant circuit 3.

The second outlet orifice 58 of the interconnection device 15 is connected to the means 16 for heating the coolant, with the fluid entering said means via an inlet 59. This heating means 16 comprises a coolant outlet 60 connected to the fluid/fluid heat exchanger 12. The coolant then passes through this fluid/fluid heat exchanger 12, then passes through the first heat exchanger associated with a component 8.

The heating means 16 comprise an electrical heating element, that is to say an element capable of delivering calories when it is supplied with power by an electrical source. According to a variant, the electrical heating element is arranged in order to operate at a voltage of between 200 V and 500 V. In such a case, the electrical source is formed by a battery module, which delivers energy to an electric motor for driving the vehicle.

By way of example, according to the embodiment presented, the first heat exchanger associated with a component 8 is a heat exchanger between the coolant and a first component of an electrical drive train of the vehicle. In particular, the first component is at least a battery, or a module of batteries, required to store the electrical energy of the vehicle and to ensure the supply of the energy necessary for moving the vehicle. According to the present embodiment, the first heat exchanger associated with a component 8 is connected on one side to the first pump 17 and on the other side to the fluid/fluid heat exchanger 12.

The second loop 14 forms a circuit, in which are located a second pump 18, the interconnection device 15, a second heat exchanger associated with a component 9, a third heat exchanger associated with a component 10, a means 61 for managing the circulation of coolant either towards the radiator 11 or towards a bypass conduit 19 of this radiator 11, hereafter referred to as the third bypass conduit 19. The coolant passes through these components in this order.

According to the example presented, the second pump 18 is, for example, an electric pump, that is to say it comprises an electric motor. It is connected to the second inlet orifice 56 of the interconnection device 15. The first outlet orifice 57 of the interconnection device 15 is, for its part, connected to an inlet orifice of the second heat exchanger associated with a component 9.

In this embodiment, the coolant passes through the second exchanger 9, then the third heat exchanger associated with a component 10 before reaching the means 61 for managing the circulation of the coolant. Said management means is particularly formed by a three-way valve installed at the confluence of a portion of the circuit containing the radiator 11 and of the third bypass conduit 19.

The three-way valve of said management means 61 is arranged downstream of the third heat exchanger associated with a component 10, according to the direction of circulation of the coolant in the second loop 14, and comprises an inlet channel 62 connected to the third heat exchanger associated with a component 10. The three-way valve of said management means 61 further comprises a first outlet port 63 and a second outlet port 64, with the first outlet port 63 being connected to the third bypass conduit 19 of the radiator 11, whereas the second outlet port 64 is connected to the radiator 11.

The radiator 11 enables a heat exchange between the exterior air flow and the coolant. The exterior air flow, which is set in motion either by the movement of the vehicle or by a fan 65, passes through said radiator. The radiator 11 is therefore an air/coolant heat exchanger.

By way of example according to the embodiment presented, the second heat exchanger associated with a component 9 is a heat exchanger between the coolant and a first component of the electrical drive train of the vehicle. In particular, the second component is at least an inverter, the function of which is to transform the direct current originating from the battery into three-phase alternating current in order to supply the electric motor for driving the vehicle.

The third heat exchanger associated with a component 10 is a heat exchanger between the coolant and a third component of the electrical drive train of the vehicle. In particular, the third component is the propulsion engine of the vehicle, in particular an electric motor.

In order to guarantee the reliability, the service life and the performance levels of the various components of this electrical drive train of the vehicle, in particular the battery or the module of batteries, it is necessary to ensure air conditioning of these components in order to keep them within a predetermined temperature range regardless of the operational phase and/or the conditions of movement of the vehicle. In cold weather, it is therefore necessary to heat the component(s), whilst in hot weather or in the charging phase it is necessary to cool them.

In addition, the second loop 14 comprises an expansion tank 66, advantageously connected to the coolant circuit 3 immediately upstream of the second pump 18, according to the direction of circulation of the coolant in the second loop 14.

The second loop 14 of the coolant circuit 2 further comprises a collection point 67 arranged between the radiator 11 and the second pump 18.

The third bypass conduit 19 connects the means 61 for managing the circulation of the coolant to the collection point 67. Thus, the circulation of the coolant inside the third bypass conduit 19 and/or inside the radiator 11 is governed by this management means 61, controlled by a control strategy implemented by the control device (not shown).

When the coolant passes through the third bypass conduit 19, the throughput of coolant in the radiator 11 is reduced or zero. Thus, the heat exchange between the coolant and the exterior air flow is reduced or eliminated.

Advantageously, the radiator 11 is installed in the front face of the vehicle in order to benefit from the dynamic air flow, as an exterior air flow, when the vehicle is in motion, possibly complemented by an air flow generated by the fan 65.

The radiator 11 can also be disposed downstream or upstream of the exterior heat exchanger 6, according to the direction of circulation of the exterior air flow 22 through these heat exchangers. The exterior heat exchanger 6 and the radiator 11 can also benefit from the air flow generated by the fan 65 in addition to the dynamic air flow.

A further provision of the invention is that the radiator 11 and the exterior heat exchanger 6 are installed side-by-side, two separate exterior air flows can then pass through each exchanger. Thus, thermal independence is provided between the radiator 11 and the exterior heat exchanger 6.

The interior air flow 22 that circulates in the housing 23 is a flow of fresh air 68 taken from outside of the passenger compartment and/or a flow of recycled air 69 taken from inside of the passenger compartment of the vehicle. The selection of the proportion of fresh air flow 68 in relation to the recycled air flow 69 entering into the housing 23 in order to form the interior air flow 22 is controlled by a selection means 70, for example, a flap.

Figure 2:
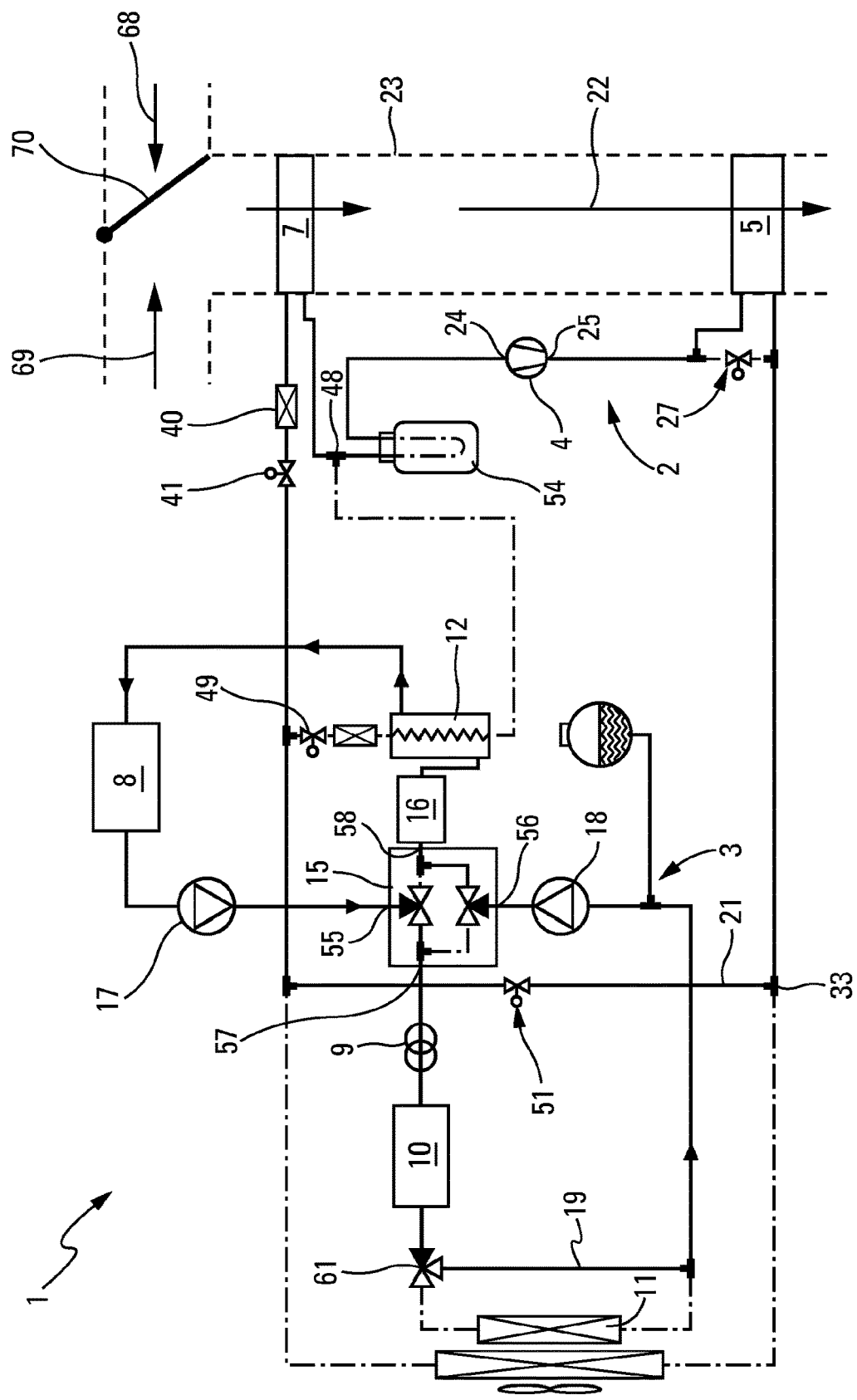
FIG. 2 shows a schematic view of the air conditioning device according to the present invention in "dehumidification" mode, according to a first variant.

FIG. 2 shows a schematic view of the air conditioning device according to the present invention in "dehumidification" mode, according to a first variant, for example when the exterior temperature is between 0° C. and 5° C.

In this configuration, the first switching means 27, in particular the first two-way valve, is arranged in order to enable the circulation of the refrigerant fluid of the compressor 4 through the interior heat exchanger 5 by the exchange of heat with the interior air flow 22. Thus, the first two-way valve of said first switching means 27 prohibits any circulation of the refrigerant fluid through the first bypass conduit 20.

In the "dehumidification" mode according to this first variant, the refrigerant fluid comes out of the interior heat exchanger 5 and is directed towards the third connection point 33. The second switching means 51 is placed in the open position in such a way as to enable circulation of the refrigerant fluid in the second bypass conduit 21. Thus, the refrigerant fluid bypasses the exterior heat exchanger 6 and therefore is not cooled by the exterior air flow.

The fourth switching means 49 is in the closed position so that the refrigerant fluid does not circulate in the part of the refrigerant circuit containing the fluid/fluid heat exchanger 12.

The third switching means 41 is in the open position and allows the circulation of the refrigerant fluid in the first expansion element 40 and then in the evaporator 7.

Between the outlet orifice 25 of the compressor 4 and the first expansion element 40, the refrigerant fluid is at high pressure and high temperature.

The first expansion element 40 lowers the pressure of the refrigerant fluid. The refrigerant fluid vapourises by exchange with the interior air flow 22 as it passes through the evaporator 7. Such an exchange of heat makes it possible to ensure cooling of the interior air flow 22 and, correspondingly, drying and/or dehumidification of this air flow.

Finally, the refrigerant fluid comes out of the evaporator 7, passes through the sixth connection point 48, optionally the accumulator 54, in order to return to the compressor 4.

Between the first expansion element 40 and the inlet orifice 24 of the compressor 4, the refrigerant fluid is at low pressure and low temperature.

With regard to the coolant circuit 3, the coolant is set in motion by the first pump 17 and/or by the second pump 18. The first loop 13 is connected to the second loop 14 by means of the interconnection device 15. In practice, the coolant which enters the interconnection device via the second inlet orifice 56 exits via the second outlet orifice 58, whilst the coolant which enters the interconnection device 15 via the first inlet orifice 55 exits via the first outlet orifice 57. It will be understood in this case that the coolant circulates successively in the first loop 13, then in the second loop 14.

In this mode, the coolant circulates successively in the heating means 16, in the fluid/fluid heat exchanger 12, in the first heat exchanger associated with a component 8, in the first pump 17, in the interconnection device 15 in the manner indicated above, in the second heat exchanger associated with a component 9, in the third heat exchanger associated with a component 10, in the third bypass conduit 19, in the second pump 18, in order finally to return to the device.

In this phase of operation, the coolant does not undergo any heat exchange with the refrigerant fluid since said fluid does not circulate through the fluid/fluid heat exchanger 12.

The means 61 for managing the circulation of coolant imposes a circulation of this fluid in the third bypass conduit 19 and prohibits the circulation of the coolant in the radiator 11. Therefore, the coolant does not undergo any heat exchange with the exterior air flow.

As it passes through the first heat exchanger associated with a component 8, the second heat exchanger associated with a component 9 and the third heat exchanger associated with a component 10, the coolant conditions, in particular heats or cools, the associated components, in this case advantageously the battery or the module of batteries and/or the inverter and/or the electric motor for driving the vehicle. Such a configuration makes it possible to share the Joule effect losses of these components and to use these losses with respect to the thermodynamic cycle which takes place in the refrigerant circuit 2.

Finally it will be noted that, advantageously, the selection means prohibit the introduction of the fresh air flow 68 and allow the introduction of the recycled air flow 69 in the housing 23.

The configuration of the air conditioning device, in "dehumidification" mode according to the first variant, offers a particular advantage in cold weather, in particular in winter. In fact, according to this arrangement, all of the condensation of the refrigerant fluid occurs in the interior heat exchanger 5. Thus, all the calories supplied by the condensation are dissipated in the interior air flow 22 diffused towards the passenger compartment. There is no discharge of calories through the exterior air flow. Therefore, there is no loss of energy. Therefore, there is a rationalisation of the on-board energy.

Figure 3:
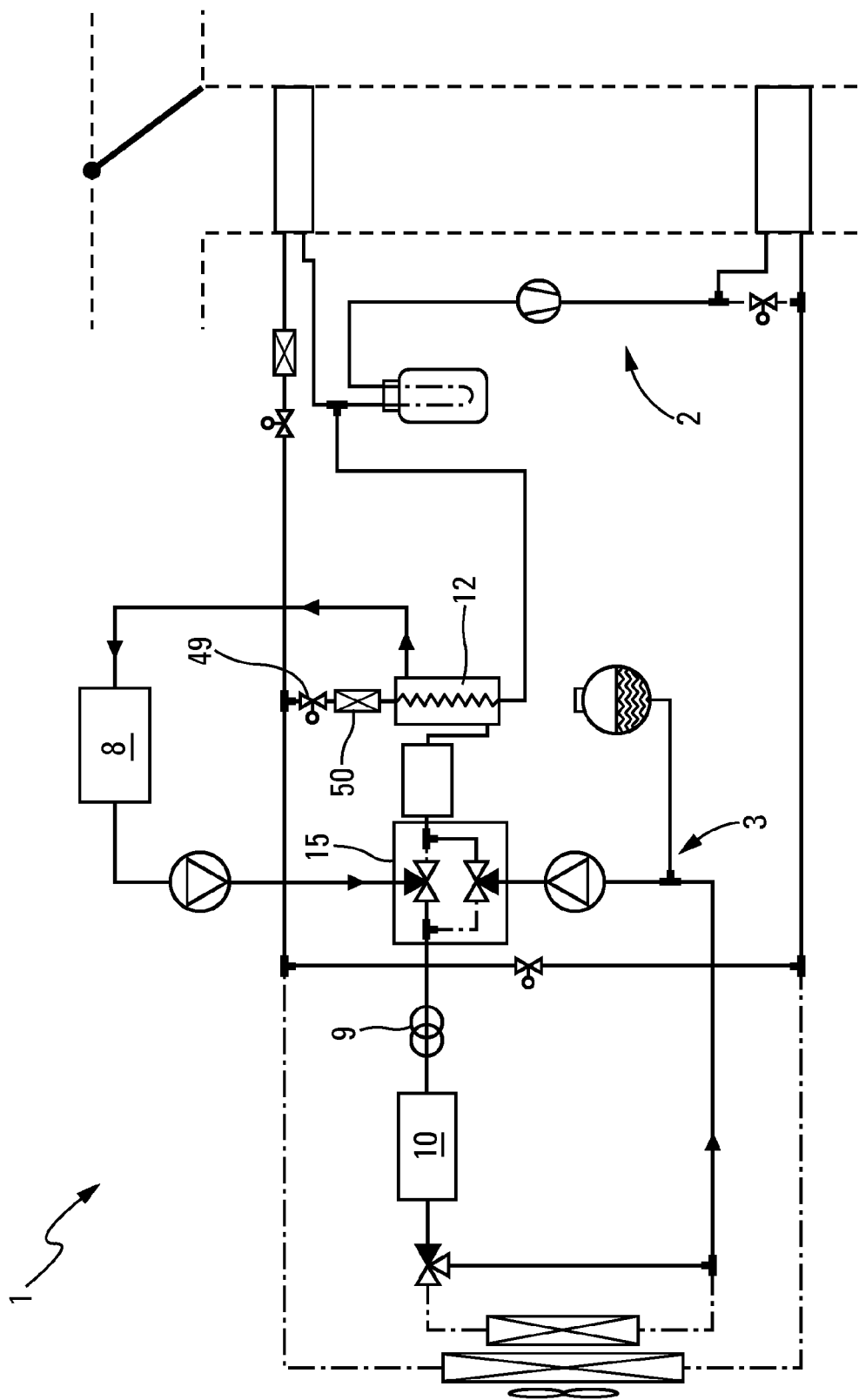
FIG. 3 shows a schematic view of the air conditioning device according to the present invention in "dehumidification" mode, according to a second variant.

FIG. 3 shows the invention in "dehumidification" mode according to a second variant. Consequently, FIG. 3 illustrates a phase of operation identical to that of FIG. 2. FIG. 3 will be described with regard to differences with respect to FIG. 2. The elements which were previously described and function in the same conditions will not be described in further detail and reference will be made to the description of FIG. 2 to this effect.

Contrary to FIG. 2, the circulation of the refrigerant fluid is allowed within the fluid/fluid heat exchanger 12. In order to do this, the fourth switching device 49 is in the open position, in such a way that the refrigerant fluid reaches the second expansion element 50.

The second expansion element 50 lowers the pressure of the refrigerant fluid. The refrigerant fluid vapourises by exchange with the coolant as it passes through the fluid/fluid heat exchanger 12. Such a configuration makes it possible to capture the calories present in the coolant, which calories are released by the components of the electrical drive train of the vehicle and collected by the first heat exchanger associated with a component 8 and/or the second heat exchanger associated with a component 9 and/or the third heat exchanger associated with a component 10.

The fluid/fluid heat exchanger 12 thus forms a lever in addition to the evaporator 7 in order to increase the quantity of refrigerant fluid evaporated. The output of the thermodynamic cycle which takes place in the refrigerant circuit 2 is improved by this configuration.

It will be noted that this configuration also makes it possible to ensure cooling of the components of the electrical drive train of the vehicle, via the refrigerant fluid.

This configuration of the air conditioning device, in "dehumidification" mode according to the first variant (FIG. 2) or the second variant (FIG. 3), has another advantage in order to ensure optimal comfort for the occupants of the passenger compartment.

In fact, the position of the selection means 70 according to FIGS. 2 and 3, referred to as the "recycling" position, ensures solely the introduction of the recycled air flow 69 into the housing 23. Such an arrangement makes it possible to improve the output of the thermodynamic cycle which takes place within the refrigerant circuit in particularly unfavourable exterior climatic conditions, for example when the exterior temperature is less than 5° C.

The configurations described in relation to FIGS. 2 and 3 are used particularly advantageously for temperate, potentially humid, climatic conditions. In fact, FIGS. 2 and 3 show the air conditioning device 1 according to two variants of the "dehumidification" mode.

Apart from climatic conditions which render the "dehumidification" mode necessary, such a "dehumidification" mode is no longer a determining parameter in the management of comfort. Thus, switching to other modes of operation is contemplated, which modes will now be described.

Figure 4:
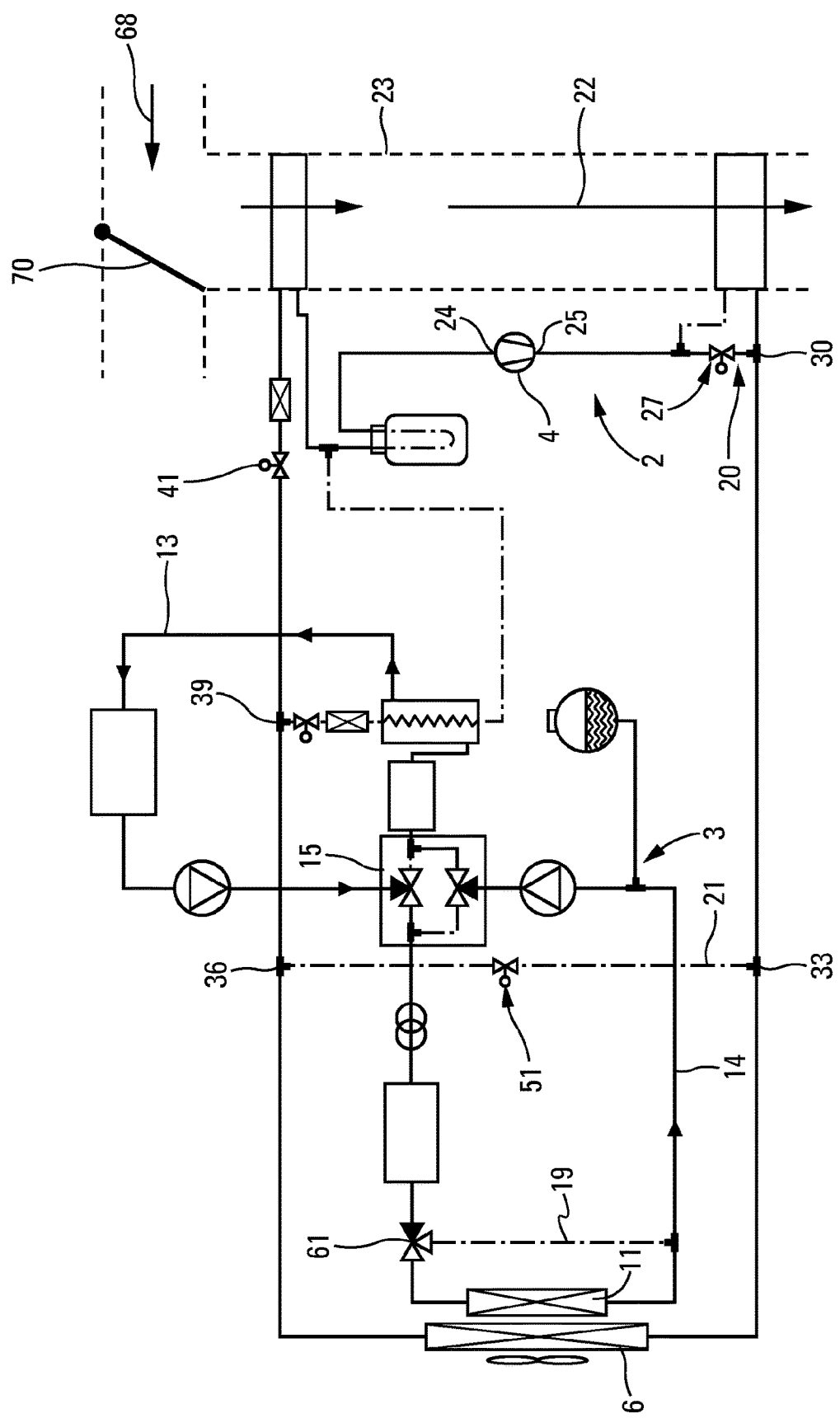
FIG. 4 shows a schematic view of the air conditioning device according to the present invention in "summer" mode, according to a first embodiment.

FIG. 4 shows a schematic view of the air conditioning device in "summer" mode, according to a first variant. FIG. 4 therefore illustrates the air conditioning device according to the present invention during a so-called "summer" mode corresponding to a requirement for the passenger compartment of the vehicle to be cooled.

The differences with respect to the configuration presented in relation to FIG. 2 will be described hereafter, and reference will be made to the description of this figure for the identical elements or positions.

According to this first variant of the "summer" mode, the first switching means 27, in particular the first two-way valve, is arranged in such a way that the refrigerant fluid passes directly from the compressor 4 towards the second connection point 30, circulating through the first bypass conduit 20. The refrigerant fluid circulates in a very small quantity in the interior heat exchanger 5 in such a way that it only undergoes a small heat exchange with the interior air flow 22 passing through the exchanger 5. It therefore retains its pressure and temperature level.

In the case of a switching means 27 formed by a three-way valve, the refrigerant fluid does not circulate in the interior heat exchanger 5 when the valve is in the open position. The refrigerant fluid does not then undergo heat exchange with the interior air flow 22 passing through the interior heat exchanger 5. It therefore retains its pressure and temperature level.

The refrigerant fluid continues its path and passes through the third connection point 33. The second switching means 51 is in the closed position so that the refrigerant fluid is obliged to pass through the exterior heat exchanger 6 since this refrigerant circuit does not use the second bypass conduit 21. It will therefore be understood that the configuration of the second switching means 51 is such that the circulation in the bypass conduit 21 is shut off.

Consequently, the refrigerant fluid successively passes through the exterior heat exchanger 6, the fourth connection point 36, the fifth connection point 39, in order to reach the third switching means 41.

In such a configuration, the refrigerant circuit dissipates its calories in the exterior air flow by means of the exterior heat exchanger 6, with said exchanger acting as a condenser.

Between the outlet orifice 25 of the compressor 4 and the first expansion element 40, passing through the exterior heat exchanger 6, the refrigerant fluid is at high pressure and high temperature, whilst between the second expansion element 40 and the inlet orifice 24 of the compressor 4 the refrigerant fluid is at low pressure and low temperature.

The configuration of the coolant circuit 3 is identical to that described for FIG. 2 with the exception of that which follows. Reference will be made to the description of FIG. 2 in order to know the structure and the position of identical components.

The means 61 for managing the circulation of coolant is placed in a position where the coolant is obliged to circulate towards the radiator 11. Thus, the management means 61 prohibit any circulation of the coolant within the third bypass conduit 19.

Such a configuration makes it possible to ensure cooling of the components of the electrical drive train of the vehicle, that is to say the battery or the module of batteries, the inverter and/or the electric motor for driving the vehicle. The coolant circulates both in the first loop 13 and in the second loop 14 and dissipates the calories collected from the components in the exterior air flow which passes through the radiator 11.

In this "summer" mode according to this first variant, the interior air flow 22, which circulates in the housing 23, is a flow of fresh air 68 taken from outside the passenger compartment. In order to do this, the selection means 70 is placed in a position where it prohibits the inlet of a recycled air flow and allows the entry of the fresh air flow 68.

Figure 5:
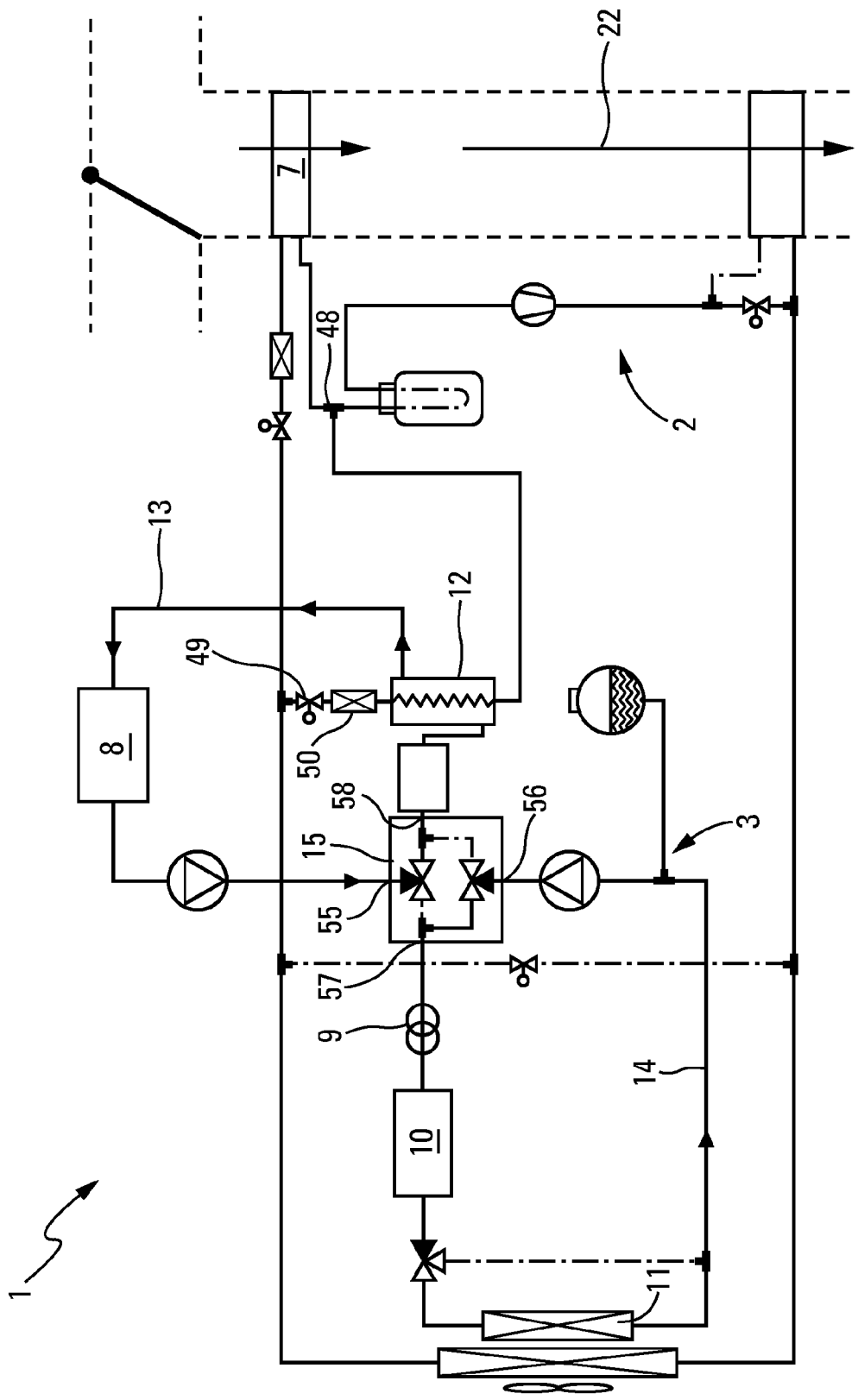
FIG. 5 shows a schematic view of the air conditioning device according to the present invention in "summer" mode, according to a second embodiment.
Figure 6:
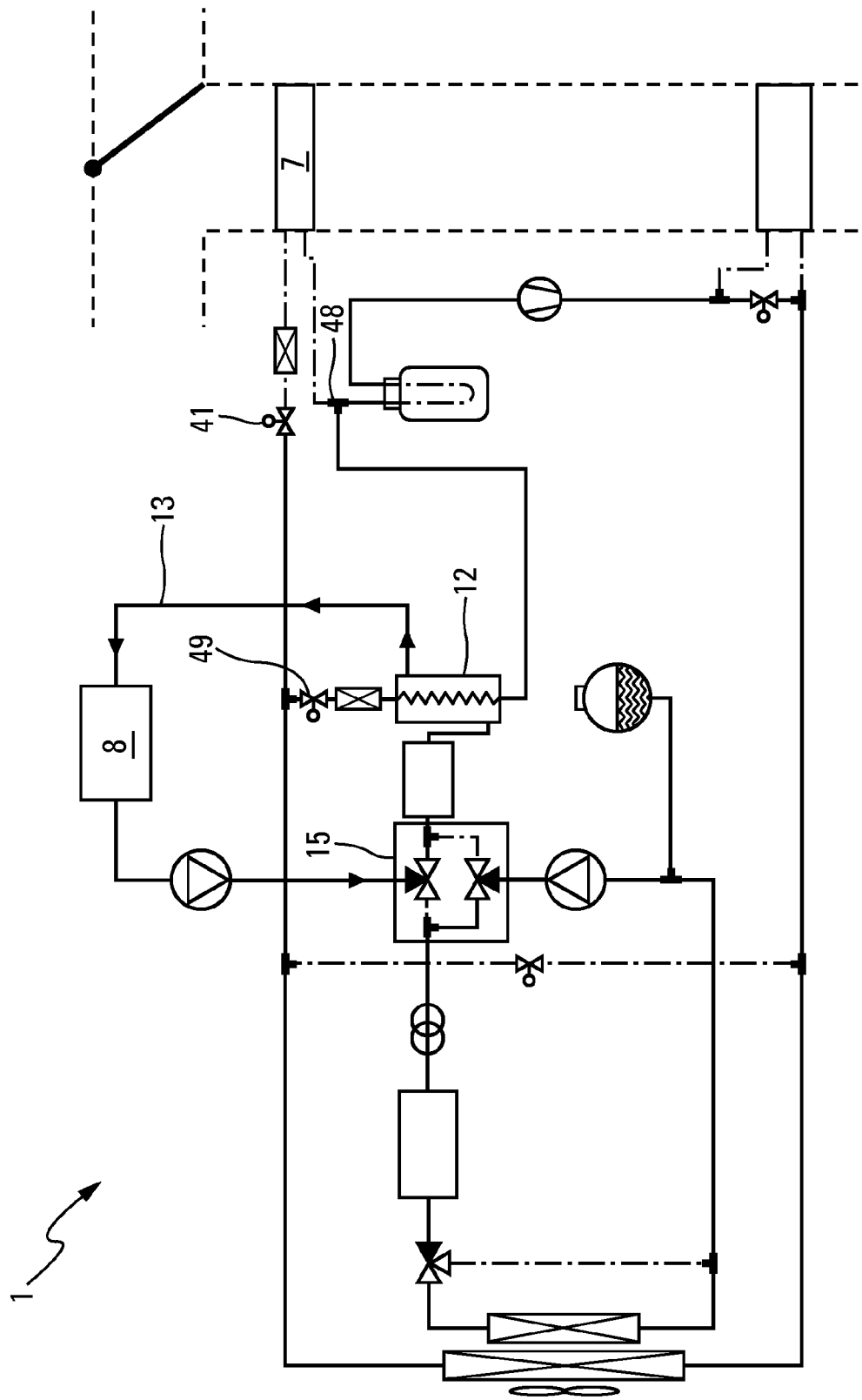
FIG. 6 shows a schematic view of the air conditioning device according to the present invention in "charging" mode.

FIGS. 4 and 6 show the air conditioning device 1 in "summer" mode according to different variants. FIGS. 5 and 6 will be described with regard to differences with respect to FIG. 4. The elements which were previously described and function in the same conditions will not be described in further detail and reference will be made to the description of the preceding figures.

FIG. 5 shows a schematic view of the air conditioning device 1 according to the present invention in "summer" mode, according to a second embodiment. Unlike FIG. 4, the refrigerant fluid is allowed to circulate in the fluid/fluid heat exchanger 12. To this end, the fourth switching device 49 is in the open position in such a way that the refrigerant fluid reaches the second expansion element 50.

This second expansion element 50 lowers the pressure of the refrigerant fluid. The refrigerant fluid vapourises by exchange with the coolant as it passes through the fluid/fluid heat exchanger 12. Such a configuration makes it possible to capture the calories present in the coolant which circulate in the first loop 13, which calories are released by the components of the electrical drive train of the vehicle and are collected by the first heat exchanger associated with a component 8, that is to say the heat exchanger dedicated to the battery or to the module of batteries.

The fluid/fluid heat exchanger 12 thus forms a lever in addition to the evaporator 7 in order to increase the quantity of evaporated refrigerant fluid, whilst cooling the component attached to the first heat exchanger associated with a component 8. The output of the thermodynamic cycle which takes place in the refrigerant circuit 2 is improved by this configuration.

The refrigerant fluid which has passed through the fluid/fluid heat exchanger 12 and the evaporator 7 is brought together in the region of the sixth connection point 48.

With regard to the coolant circuit, it will be noted that the interconnection device 15 is placed in a position where it separates the first loop 13 from the second loop 14. In other words, the coolant which circulates in the first loop 13 is separate from the coolant which circulates in the second loop 14. Thus, the first loop 13 is separated from the second loop 14 and the coolant which circulates in the first loop 13 does not mix with the coolant circulating in the second loop 14.

In practice, the first inlet orifice 55 of the interconnection device 15 is connected to the second outlet orifice 58 whilst the second inlet orifice 56 is connected to the first outlet orifice 55. In this way, the circulation of the coolant in the first loop 13 is rendered independent of the circulation of the coolant present in the second loop 14.

Such a phase of operation makes it possible to ensure the cooling of the interior air flow 22 sent into the passenger compartment. It is also possible to ensure a different cooling between, on the one hand, the first heat exchanger associated with a component 8 and, on the other hand, the second heat exchanger associated with a component 9 and the third heat exchanger associated with a component 10.

The first heat exchanger associated with a component 8 is then cooled exclusively by the refrigerant circuit 2, by means of the fluid/fluid heat exchanger 12. The second heat exchanger associated with a component 9 and the third heat exchanger associated with a component 10 are cooled exclusively by the heat exchange carried out in the region of the radiator 11.

Such a configuration is, in particular, used in the case where the exterior temperature is high in order to guarantee suitable cooling of the associated components, in this case, advantageously, the battery or the module of batteries and/or the inverter and/or the electric motor for driving the vehicle, by means of the first heat exchanger associated with a component 8 and/or the second heat exchanger associated with a component 9 and/or the third heat exchanger associated with a component 10.

Such a configuration is also particularly advantageous in the case where the exterior temperature is high, this temperature being higher than a limiting temperature threshold guaranteeing the durability of the battery or of the module of batteries, with said module of batteries being more particularly sensitive to temperature differences. For this reason, in this mode the cooling of the first heat exchanger associated with a component 8 is ensured exclusively by the refrigerant circuit, as described above.

This configuration also has an advantage by using the calories transported by the coolant to heat the refrigerant fluid in order to increase the heat exchanges on the low-pressure and low-temperature side. This contributes to an increase in the output of the thermodynamic cycle which takes place within the refrigerant circuit 2.

FIG. 6 shows a schematic view of the air conditioning device 1 in "charging" mode. Reference will be made to the description of FIG. 5, with the following description specifying the different elements or functions.

This "charging" mode relates to the case where the component attached to the first heat exchanger associated with a component 8 is a battery or a module of batteries, and that said battery or module of batteries is in the charging phase. In such a situation, the battery heats up. In order to maintain the service life and/or to optimise the operation of the battery, it is necessary to ensure the cooling thereof.

In order to ensure maximum cooling of the coolant circulating in the first loop 13, the third switching means 41 is placed in a closed position whilst the fourth switching means 49 is in the open position. Therefore, the refrigerant fluid does not circulate in the evaporator 7 and all of the refrigerant fluid is sent towards the fluid/fluid heat exchanger 12, passing through the second expansion element 50, which ensures a lowering of the pressure of this refrigerant fluid prior to its entry into the fluid/fluid heat exchanger 12.

As all of the evaporation of the refrigerant fluid takes place by heat exchange with the coolant present in the first loop 13, the temperature of said fluid is lowered in such a way as to guarantee the cooling of the battery during the charging phase.

Figure 7:
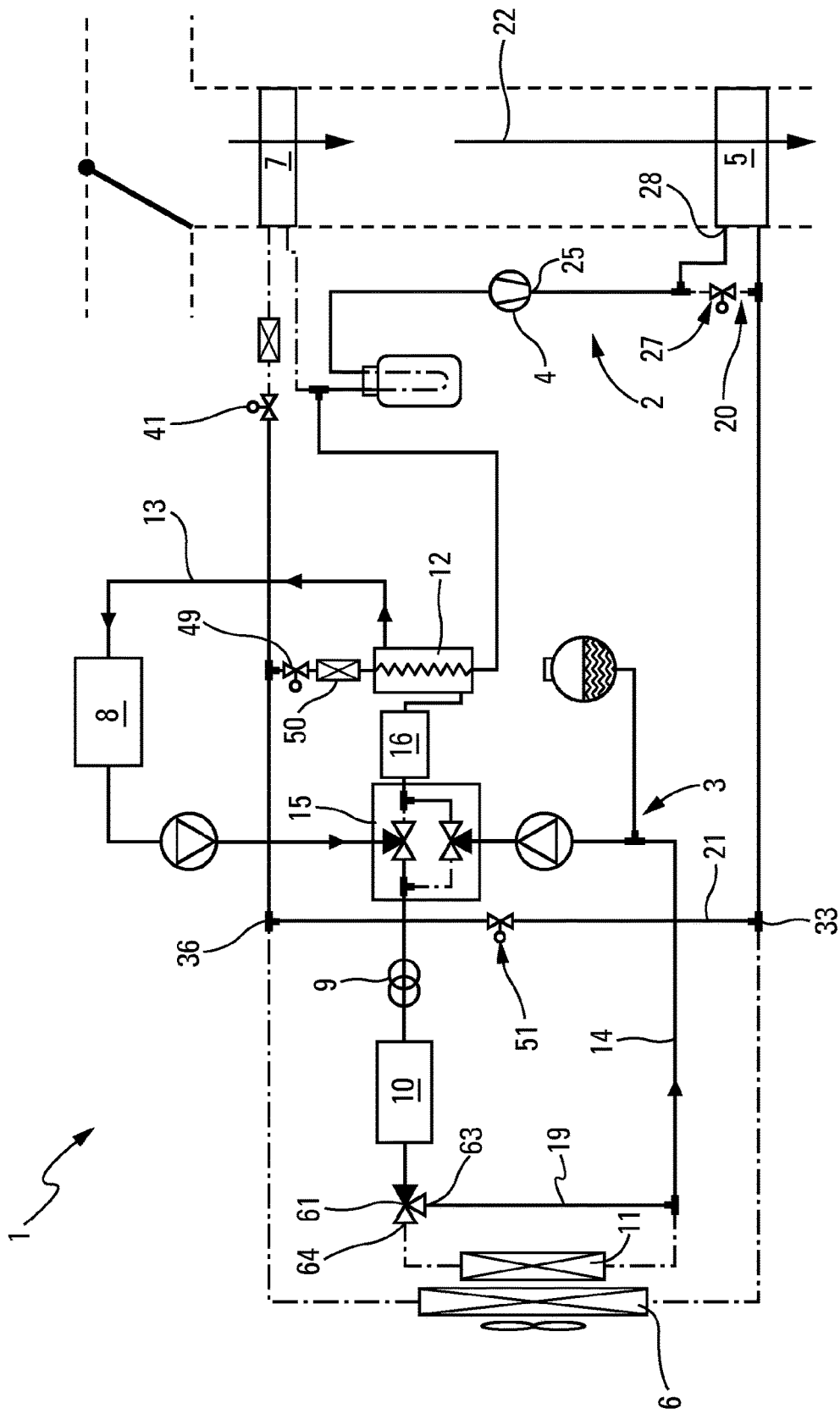
FIG. 7 shows a schematic view of the air conditioning device according to the present invention in "winter" mode.

FIG. 7 shows a schematic view of the air conditioning device 1 according to the present invention in "winter" mode. Therefore, FIG. 7 illustrates the air conditioning device during a "winter" phase of operation, corresponding to a requirement for the passenger compartment of the vehicle to be heated.

In this configuration, the first switching means 27, in particular the first two-way valve, is in the closed position in order to allow circulation of the refrigerant fluid in the interior heat exchanger 5. To this end, the first two-way valve of said switching means 27 is arranged in order for the outlet opening 25 of the compressor 4 to communicate with the inlet 28 of the interior heat exchanger 5. Thus, the refrigerant fluid circulates from the compressor 4 through the interior heat exchanger 5 by the exchange of heat with the interior air flow 22 in order to heat the passenger compartment. The refrigerant fluid therefore does not pass into the first bypass conduit 20.

The refrigerant fluid exits the interior heat exchanger 5 and is directed towards the third connection point 33, where this refrigerant fluid is branched-off towards the second bypass conduit 21. In order to do this, the second switching means 51 is in the open position, which results in bypassing of the exterior heat exchanger 6. Therefore, the refrigerant fluid arriving at the fourth connection point 36 is not cooled by the exterior air flow.

As in the case of FIG. 6, the third switching means 41 is in the closed position whilst the fourth switching means 49 is in the open position. Therefore, the refrigerant fluid does not circulate in the evaporator 7 and all of the refrigerant fluid is sent towards the fluid/fluid heat exchanger 12, passing through the second expansion element 50, which ensures a lowering of the pressure of this refrigerant fluid prior to its entry into the fluid/fluid heat exchanger 12.

The coolant circuit 3 is configured in an identical manner to the variant explained in relation to FIG. 2, where the first loop 13 is connected to the second loop 14 by the interconnection device 15 and where the coolant bypasses the radiator 11 by passing through the third bypass conduit 19.

The heating means 16 is activated here. In other words, its electrical heating element is connected to a source of electrical energy in such a way as to supply calories to the coolant which passes through the heating means 16. This elevation of the temperature of the coolant immediately upstream of the fluid/fluid heat exchanger 12 guarantees a sufficient temperature difference between the coolant and the refrigerant fluid both passing through the fluid/fluid heat exchanger 12. Thus, the output of the thermodynamic cycle which takes place in the refrigerant circuit 2 is improved.

The activation of the heating means 16 also makes it possible to heat the coolant in such a way as to maintain or reach a temperature of the first heat exchanger associated with a component 8 that is above a defined temperature threshold. In the case of a battery, or a module of batteries, this configuration is advantageous since the service life and/or the capacity of a battery is affected when its temperature falls below the defined threshold.

In one or the other of the two cases described above, the interconnection device 15 can be placed in a position where the first loop 13 is isolated from the second loop 14, in particular according to the mode described in FIG. 5. This makes it possible to reserve the calories generated by the heating means 16 solely for the fluid/fluid heat exchanger and/or for the first heat exchanger associated with a component 8, intended for the battery or for the module of batteries.

The activation of this heating means 16 can be carried out in particular in order to generate additional power necessary for the effective functioning of the thermodynamic cycle when said cycle functions as a heat pump.

By way of example, the heating means 16 is an immersion heater submerged in the coolant. The immersion heater is arranged in order to operate at a supply voltage of between 200 V and 500 V, and advantageously identical to the supply voltage provided by the battery, or the module of batteries. The immersion heater is advantageously self-regulating, in the sense that it comprises a thermostat which detects the temperature of the coolant in order to allow or prevent implementation of the immersion heater.

This activation can also be performed, for example, during a stoppage of the vehicle.

The configuration shown in FIG. 7 shows even more advantages. In fact, it makes it possible, by placing the first loop 13 in communication with the second loop 14, to collect calories in the region of the second heat exchanger associated with a component 9 and/or in the region of the third heat exchanger associated with a component 10 in order to dissipate them by heat exchange in the fluid/fluid heat exchanger 12 with the refrigerant fluid. This is the case in particular when the electric motor drives the vehicle and releases calories.

According to the configuration illustrated in FIG. 7, the first loop 13 and the second loop 14 of the coolant circuit 3 are, for example, in series with one another. Thus, the calories dissipated by the various components of the electrical drive train, in particular the electric motor for driving the vehicle and the inverter, are shared. This also makes it possible to heat the battery, or the module of batteries, in motion in order to progress towards more advantageous output levels in a reduced amount of time.

When the optimal operating temperature is achieved, it is necessary to discharge the calories dissipated by the components disposed in the coolant circuit 3, in this case the battery or the module of batteries, and/or the inverter and/or the electric motor for driving the vehicle, towards the exterior by means of the radiator 11.

The temperature regulation is performed by the regulation of the means 61 for managing the circulation of coolant. This regulation enables a circulation of coolant in the radiator 11 and/or in the third bypass conduit 19, in particular according to the degree of opening of the first outlet channel 63 and of the second outlet channel 64 of the management means 61.

Clearly, in all of the embodiments presented in FIGS. 1 to 7, the interconnection device 15 can always be configured in order to isolate or share the first loop 13 and the second loop 14 of the coolant circuit 3.

The interconnection device 15 therefore makes it possible to decouple the cooling of the first component, that is to say the battery or the module of batteries, from the second component and/or the third component, respectively, the inverter and/or the electric motor for driving the vehicle. Such a thermal insulation of these components is advantageous, in particular in the case of very high exterior air temperatures, where the radiator 11 does not allow additional cooling of the coolant to be provided (case of FIG. 5).

On the other hand, the heat exchange carried out in the radiator 11 is capable of heating the coolant, which is also cooled by the fluid/fluid heat exchanger 12. By decoupling the first loop 13 and the second loop 14 of the coolant circuit 3, the temperature of the coolant in the first loop 13 is cooler than the temperature of the coolant in the second loop 14.

This improves the cooling of the first component, that is to say the battery or the module of batteries. However, the temperature of the coolant in the second loop 14 is higher. This is less of a concern since the second component, that is to say the inverter, and the third component, that is to say the electric motor for driving the vehicle, are less sensitive to the variations of temperature.

It is particularly noteworthy that, in the modes described above, the exterior heat exchanger is either unused, that is to say not passed through by the refrigerant fluid, or is used in condenser mode. However, it is not used in evaporator mode, which avoids any formation of frost on the surface of this heat exchanger when the climatic conditions are humid and cold, in particular close to or below 0° C.

Of course, the invention is not limited to the embodiments described above and which are provided solely by way of example. It covers various modifications, alternative forms and other variants that a person skilled in the art can contemplate within the scope of the present invention and, in particular, any combinations of the various previously described embodiments.

By way of example, the heat exchangers 13 and 14 can also be associated with a DC/DC converter intended for the charging of a low-voltage battery by the high-voltage battery.

Furthermore, the device according to the invention can further comprise positioning in series, in parallel or a series and parallel combination of heat exchangers associated with the components. By way of example, the heat exchanger 9 connected to the inverter can be disposed in series with the heat exchanger connected to the DC/DC converter, whilst the heat exchanger 10 associated with the motor is disposed parallel to all of the heat exchangers connected to the inverter and the DC/DC converter.

The invention claimed is:

1. An air conditioning device (1) comprising:
a refrigerant circuit (2) comprising at least a compressor (4), an interior heat exchanger (5), an exterior heat exchanger (6) and an evaporator (7);
a coolant circuit (3) comprising at least a first heat exchanger associated with a first component (8), a second heat exchanger associated with a second component (9) and a radiator (11) and a third heat exchanger associated with a third component (10) installed in the second loop (14), wherein said first component (8) is at least one battery, said second component (9) is at least one inverter and said third component (10) is an electric motor; and
a fluid/fluid heat exchanger (12) installed in the refrigerant circuit (2) and in the coolant circuit (3);
wherein the coolant circuit (3) comprising a first loop (13) and a second loop (14) interconnected by an interconnection device (15), with the first loop (13) comprising the fluid/fluid heat exchanger (12), the first heat exchanger associated with the first component (8) and a means (16) for heating coolant with the heating means (16) interposed between the interconnection device (15) and the fluid/fluid heat exchanger (12), and the second loop (14) comprising the second heat exchanger associated with the second component (9) and the radiator (11).

2. The air conditioning device (1) according to claim 1, wherein the heating means (16) comprise an electrical heating element.

3. The air conditioning device (1) according to claim 1, wherein the heating means (16) is installed immediately upstream of the fluid/fluid heat exchanger (12), according to the direction of circulation of the coolant in the first loop (13).

4. The air conditioning device (1) according to claim 1, wherein the heating means (16) is installed immediately downstream of the interconnection device (15), according to the direction of circulation of the coolant in the first loop (13).

5. The air conditioning device (1) according to claim 1, wherein the first loop (13) comprises a first pump (17) for circulation of the coolant, and wherein the second loop (14) comprises a second pump (18) for circulation of the coolant.

6. The air conditioning device (1) according to claim 1, wherein the second loop (14) comprises a radiator bypass conduit (19) of the radiator (11).

7. The air conditioning device (1) according to claim 1, wherein the fluid/fluid heat exchanger (12) is installed parallel to the evaporator (7).

8. The air conditioning device (1) according to claim 1, wherein the refrigerant circuit (2) includes an interior heat exchanger bypass conduit (20) of the interior heat exchanger (5).

9. The air conditioning device (1) according to claim 8, wherein the refrigerant circuit (2) includes an exterior heat exchanger bypass conduit (21) of the exterior heat exchanger (6).

10. The air conditioning device (1) according to claim 1, wherein an interior air flow (22) is channeled through a housing (23) in which the evaporator (7) and the interior heat exchanger (5) are disposed in order for the interior air flow (22) to pass through the housing (23) prior to distribution in a passenger compartment of a vehicle.

11. The air conditioning device (1) according to claim 9, wherein the refrigerant fluid circulates in the refrigerant circuit (2), successively, in the compressor (4), the interior heat exchanger bypass conduit (20), the exterior heat exchanger (6) or the exterior heat exchanger bypass conduit (21), the evaporator (7) and/or the fluid/fluid heat exchanger (12), in order to return to the compressor (4).

12. The air conditioning device (1) according to claim 9, wherein the refrigerant fluid circulates in the refrigerant circuit (2), successively, in the compressor (4), the interior heat exchanger (5), the exterior heat exchanger (6) or the exterior heat exchanger bypass conduit (21), the evaporator (7) and/or the fluid/fluid heat exchanger (12), in order to return to the compressor (4).

13. The air conditioning device (1) according to claim 1, wherein the coolant circulates in the first loop (13), successively, in the first heat exchanger associated with the first component (8), the interconnection device (15), the heating means (16), the fluid/fluid heat exchanger (12), in order to return to the first heat exchanger associated with the first component (8).

14. The air conditioning device (1) according to claim 6, wherein the coolant circulates in the second loop (14), successively, in the second heat exchanger associated with the second component (9), the radiator (11) and/or the radiator bypass conduit (19), the interconnection device (15), in order to return to the second heat exchanger associated with the second component (9).

15. The air conditioning device (1) according to claim 6, wherein the coolant circulates in the coolant circuit (3), successively, in the first heat exchanger associated with the first component (8), the interconnection device (15), the second heat exchanger associated with the second component (9), the radiator (11) and/or the radiator bypass conduit (19), the interconnection device (15), the heating means (16), the fluid/fluid heat exchanger (12), in order to return to the first heat exchanger associated with the first component (8).

* * * * *